3,832,224
METHOD OF COATING PRESSED VERMICULITE
WITH A GLAZE COMPOSITION
Patrick Michael Brown, Baltimore, Md., assignor to
W. R. Grace & Co., New York, N.Y.
Filed Nov. 17, 1972, Ser. No. 307,752
Int. Cl. C03c 17/02, 25/00
U.S. Cl. 117—123 A                                      1 Claim

ABSTRACT OF THE DISCLOSURE

The invention disclosed provides a novel glaze composition comprising as essential components from about 18 to about 30 parts by weight of boron oxide, from about 35 to about 55 parts by weight of silicon dioxide, from about 5 to about 20 parts by weight of aluminum oxide, from about 7 to about 15 parts by weight of calcium oxide from about 1.0 to about 3.0 parts by weight of sodium oxide, from about 0.5 to about 2.0 parts by weight of potassium oxide, from about 1.0 to about 8 parts by weight of zinc oxide. When fired as a coating on a pressed vermiculite body, the glaze components fuse to form a glaze coated article which, after cooling, typically has increased strength, excellent hardness, and improved resistance to moisture permeation. The glazed article is especially useful in the form of a panel for interior or exterior construction.

---

Figure 1:

The present invention relates to a new improved glaze composition, a method for increasing the strength of a pressed vermiculite body using the composition, and to pressed vermiculite articles glazed with the composition.

The term "glaze" as used herein includes vitreous or glass-like coatings which may range in opacity from clear or transparent to opaque. The expression "glaze components" is used herein to refer to the essential components of a glaze composition, which melt or fuse together when heated to form a vitreous coating.

Expanded vermiculite is a light-weight, highly porous lamellar-like material. It is quite weak and readily absorbs moisture. Pressing and firing expanded vermiculite under appropriate conditions results in a stronger compact material with higher modulus or rupture and lighter weight relative to many conventional ceramic materials. While these properties have created interest in pressed vermiculite for use in construction panels, its surface typically lacks satisfactory hardness for good durability and it absorbs moisture quite readily.

Numerous glaze compositions are available to the art. However, the prior art glaze compositions are not entirely satisfactory for glazing pressed vermiculite. The softness of the surface and other characteristic properties of pressed vermiculite bodies make them difficult to glaze using heretofore known glaze compositions. Glazes formed from conventional glaze compositions on pressed vermiculite typically have poor hardness and inadequate resistance to puncture on impact. Increasing the thickness of conventional glaze coatings does not adequately overcome these problems since any improvements are offset by increased weight and higher cost of the products. Normal fluxes in prior art glaze compositions usually deleteriously affect vermiculite and often decrease the strength of the body, while glazes having high levels of alkali metals, after being fired on vermiculite, typically undergo crazing during cooling. Crazing is not only aesthetically objectionable but also seriously weakens the glazed article. While reasons for crazing are not entirely understood, the normally high thermal coefficients of expansion for high alkali metal glazes relative to vermiculite are believed to substantially contribute to the problems.

It has now been found by practice of the present invention that a novel glaze composition is provided which may be used to effectively glaze pressed vermiculite bodies. Increases in pressed vermiculite strength of more than 50 percent have been observed in some cases with glazes formed from the present glaze composition. Glazed vermiculite bodies may thus be formed which typically are characterized with excellent adhesion of between the glaze to the pressed vermiculite, improved hardness, effective moisture barrier properties, and substantial freedom from crazing. Improved construction panels and other articles typically having these desirable characteristics are provided by the present invention without requiring costly thick coatings of the glaze.

Generally stated, the present invention is for a novel glaze composition which includes as essential ingredients particular glaze components subsequently set forth herein. When the composition is coated and fired on a pressed vermiculite body, the glaze components fuse to form a glaze coated article which after cooling typically is characterized with increased strength, excellent hardness, and improved resistance to moisture permeation. Good resistance to attack by highly acidic and highly alkaline substances has been observed for the coatings.

The invention disclosed provides a novel method for developing a glaze coating of increased thickness, strength, hardness, impermeability and appearance on a porous lightweight body, and the glaze composition developing this coating consisting essentially of from about 20 to about 35 parts by weight of boron oxide, from about 35 to about 55 parts by weight of silicon dioxide, from about 5 to about 20 parts by weight of aluminum oxide, from about 5 to about 15 parts by weight of calcium oxide, from about 1.0 to about 3.0 parts by weight of sodium oxide, from about 0.5 to about 2 parts by weight of potassium oxide, from about 1 to about 8 parts by weight of zinc oxide, from about 0 to 0.4 part by weight of ferric oxide, from about 0 to about 0.3 part by weight of lithium oxide, from about 0 to about 0.3 part by weight of magnesium oxide and from about 0 to 0.2 part by weight of titanium dioxide. When this glaze is applied as a coating on a pressed vermiculite body and fired, the glaze components fuse to form a glaze coated article which, after cooling, typically has increased strength, excellent hardness, and improved resistance to moisture permeation. The glazed article is especially useful in the form of a panel for exterior or interior construction.

Most common glazes do not react with the body of the structure in glazing, they simply melt and flow over the surface. They are what is normally termed a balanced glaze (i.e., satisfied in composition with silica and alumina). The thickness of the final coating as obtained with a conventional glaze is usually less than that which is initially applied due to densification upon melting. The only way this thickness can be increased is by applying additional glaze.

Figure 2:
Figure 3:
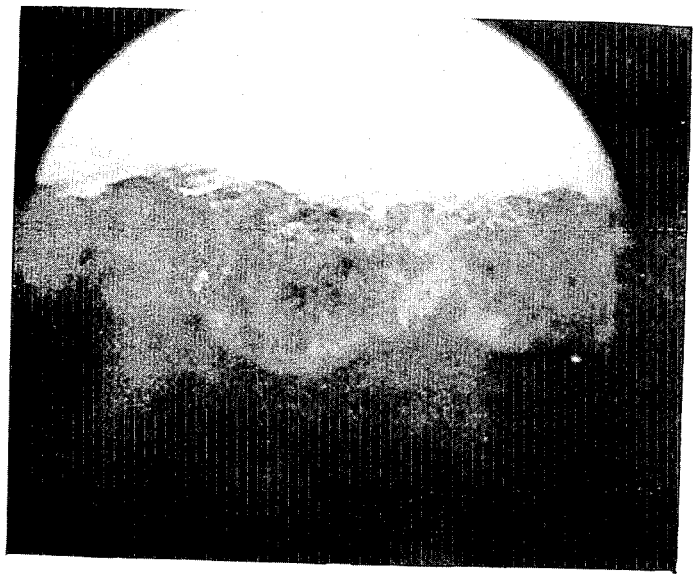

However, with our novel glaze and application, we have employed an unbalanced glaze, one which will readily react with a silica alumina body such as vermiculite and bring it into solution. As a result we form a thicker, harder glaze with greater body-glaze bond strength. This is obvious from the photographs in which FIG. 1 shows the green coating dried at 110° C. FIG. 2 shows coating after treating to 1600° F. for 3 hours wherein the coating is melted and densified. FIG. 3 shows the final coating after heating to 1850° F. for 6 hours. This method provides a harder, thicker and stronger glaze than would otherwise be possible with conventional glazing techniques.

Typically, the glaze composition is prepared in finely divided form as a suspension of from about 60 to about 75 percent by weight of the glaze components in a liquid, usually water. A suspending agent is included in the liquid to assist in holding the glaze components in uniform suspension. Suitable suspending agents include, for example, glue, gum, tragacanth, carboxymethyl cellulose, dextrine, and gelatine. Carboxymethyl cellulose is preferred for better glaze properties. The suspending agent may be present in any amount which is effective for suspending the glaze components in finely divided form. While effective amounts depend on the particular suspending agent, the amount of suspending agent included may generally be from about 0.01 to about 2 percent by weight based on the weight of the liquid. Excellent results have been obtained using from about 0.05 to about 1.0 percent by weight of carboxymethyl cellulose. Coloring agents and clay diluents may be included if desired and as may be required for particular end uses.

Glaze components are usually defined in the art in terms of their oxides. Frits are made by well known techniques of smelting the various oxides to a vitreous state followed by quenching in water or other suitable liquid. The present glaze composition may be prepared in any suitable manner. The various oxides in frit-form may be ground to suitable finely divided form or fineness such that they may be mixed with liquids and suspending agents to form uniform suspensions of the glaze composition.

The use of this particular glaze in the fritted form is essential when bodies to be glazed are heated up slowly. Slow heating of an unfritted composition allows loss of the $B_2O_3$ prior to melting and results in a glaze which does not fire out satisfactorily. However, it is not necessary that the present glaze composition be prepared from frits when a rapid heat up is employed and melting occurs prior to appreciable $B_2O_3$ loss. The glaze composition may be prepared from a variety of simple or complex commercially available oxide compositions or materials, including minerals, clays, and the like. Suitable materials include those which will provide a glaze composition containing the glaze components or essential ingredients in the amounts set out above. The glaze composition may be prepared in finely divided form as a liquid suspension by charging the various ingredients to a ball mill and milling the charge until the desired fineness is obtained.

The present method for increasing the strength of a pressed vermiculite body which may be a panel or board includes initially coating a surface of the body with a liquid suspension of the glaze composition in finely divided form. The coating may be applied using any suitable coating technique including, for example, spraying, dipping, brushing and sloshing. Spraying is generally preferred for more uniform glaze coatings.

The pressed vermiculite body being treated may have almost any shape. However, for purposes of simplicity, the description which follows is given principally for coating a pressed vermiculite panel or board. The panels may have almost any thickness desired for a particular end use. Generally, the panels are from about ¼ inch to about 1½ inches in thickness. Especially good results have been observed using panels of from about ½ inch to about 1 inch in thickness.

The coating may be applied in any suitable thickness for a particular end use. Typically, the coating is applied at a sufficient rate to provide, after firing, from about 0.2 to about 0.9 gram of glaze per square inch of panel surface. The thickness of glazes applied at rates in the range given will vary somewhat depending on the particular glaze formulation. Generally, the glaze coating after firing will be from about 0–0.30 to about .060 inch in thickness. Coatings of less than about 0.030 inch generally do not sufficiently enhance the properties of pressed vermiculite to make it commercially attractive for construction use, while coatings of more than about 0.060 inch generally do not provide sufficient additional improvement to justify their added cost.

After the liquid suspension of the glaze composition is coated onto the pressed vermiculite panel, the coated panel is dried at a temperature of from about 75° F. to about 300° F. for from about 24 to about 3 hours. The coatings at this point are no longer fluid and adhere to the panels with a high green or bisque strength which typically withstands handling and flexing without separation. Such favorable bisque strength is especially apparent for embodiment glaze compositions prepared with kaolin as a source of binder within the system.

After drying, the coated panel is heated to a sufficient temperature and maintained thereat for a sufficient time to fire or mature the glaze components. In general, the firing or fusing temperature must be at least 1600° F. in order for maturing to be effected in commercially acceptable periods of time. Typically, firing at temperatures from about 1800° F. to about 1950° F. is completed in about 2 hours, with resulting increases in panel flexural strength of at least 30 percent relative to the untreated pressed vermiculite panels.

Substantial increases in panel flexural strength may be effected with firing at a temperature of from about 1600° F. to about 2000° F. for from about 1 to about 8 hours.

After firing, the glazed pressed vermiculite panels may be cooled in air. The glaze is usually characterized with a thermal coefficient of expansion of from about 6.8 to about $7.8 \times 10^{-6}$ units per ° C. over the range from 50° C. to 450° C. which provides a compatible match between the glaze and the pressed vermiculite panel which typically is characterized with a thermal coefficient of expansion of from about 7.0 to about $8.0 \times 10^{-6}$ units per ° C. over the aforesaid temperature range. This matching aids in providing the observed substantial freedom from crazing during the firing and cooling steps. Excellent resistance to crazing is usually observed even though cooling to ambient air temperature is effected by removing samples at temperatures as high as 700° F.

In commercial practice, the drying step may be conveniently carried out while heating the coated vermiculite articles to the firing temperature. The present method may be practiced in continuous or batchwise manner. Firing may be effected using conventional firing apparatus, including kilns or the like. In convenient manner, the coated articles may be dried in a warm-up zone of the kiln or other suitable firing apparatus in continuous production operations. In batchwise operation, drying may conveniently be carried out during warm-up in an initial stage of the firing step.

The present invention will be further illustrated by the following non-limiting examples. All parts and percentages given throughout this disclosure are by weight unless indicated otherwise.

The dried coat of glaze composition is called a bisque coat, the strength of which is the bisque strength. This coat should be loose and porous and should have the ability to withstand strains when bending. The measure of this is the tearing strength. In testing the tearing strength, a generally rectangular 4 inch by 12 inch unfired coated panel was suspended on a rack between two metal rollers spaced approximately 8 inches apart. A third metal roller was placed under the center of the panel on a lift jack which was raised to a specified height in order to flex the panel. Flexures of ⅛ inch, 5/16 and ½ inch were applied, corresponding to bends of 5 degrees, 15 degrees and 25 degrees. This tearing strength test is designed to simulate the stresses a large unfired glaze coated panel (such as an interior or exterior wall panel) would be subjected to in commercial production.

After the panels were flexed, they were fired in a muffle furnace at 1850° F. for 3½ minutes, then cooled and the surface examined. Weak bisque coats are evidenced in the thus tested fired panels in the form of cracks, both large and hairline or in the form of fish scales.

The presence of cracks around the area of flexure is evidence of a poor coating, the degree of which is determined by the length of the cracks. The cracks are generally parallel to the line of flex and are measured by the distance from the center of the flexure.

The flexural strengths of the untreated pressed vermiculite panels and of the fired and cooled glaze coated panels were measured using a modification of the above described bisque strength test procedure. In the flexural strength tests, a panel with a length to thickness ratio of at least 10 to 1 is supported across a span of at least 10" where the panel width is preferably 6" but in no case less than 3". The panel is supported at two points across a span in the flatwise position on the bearing edges and the load applied at the mid-span, across the width and perpendicular to the top face of the specimen. The speed of the moving head of the testing machine, during the application of the load, was not more than 0.5 in./min. or the rate of loading does not exceed 500 lb. per min.

The load is applied until definite failure occurs, and the maximum load in pounds as indicated by the testing equipment is recorded. The flexural formula:

$$F.S. = \frac{3\,Wl}{2\,b(d)^2}$$

where F.S. is the flexural strength, W is the applied force at rupture, $l$ is the length of the span, $b$ is the width of the speciment being tested and $d$ is its thickness.

The resistance to moisture permeation of the glazed vermiculite was tested by employing the standard ink test. This amounts to applying a liberal amount of ink over the surface allowing a time of approximately 1 hr. for any to permeate the surface, wiping the surface clean and examining the surface for any ink thereon.

Example 1

The below indicated commercially available components in the amounts indicated were charged to a ball mill and ground for 16 hours:

| Components: | Approximate Parts by Weight |
|---|---|
| Boric Acid | 100 |
| Wollastonite [a] | 50 |
| Feldspar [b] | 50 |
| Jackson ball clay | 75 |
| CMC-7 MC [c] | 2.5 |
| Zinc Oxide | 5.0 |
| Water | 300 |

[a] A mineral consisting essentially of $CaO:SiO_2$.
[b] A mineral consisting essentially of $K_2O:Al_2O_3:6SiO_2$.
[c] A carboxymethyl cellulose gum product by Pemco Co.

The 45 percent aqueous suspension or slurry of finely divided particles of glaze composition was recovered from the mill. The suspension was sprayed over the 4 x 12 inch surfaces of a generally rectangular 4 x 12 x ½ inch pressed vermiculite panel at a coating level of 0.3 gram of solids per square inch using a conventional commercially available spray gun supplied with about 40 pounds of air pressure. The uncoated fired panel had a flexural strength of 1025 p.s.i. (pounds per square inch) as determined by the above described test.

The coated panel was dried at 300° F. for 3 hours. The bisque strength of the dried coating was determined using the test procedure described above. The observed substantial freedom from cracks showed that the bisque strength of the green glaze coating was good to excellent.

The dried coated panel was fired by heating to 1890° F. and maintaining the temperature for 2 hours. After cooling to ambient temperature upon standing in the kiln for about 8 hours or until the temperature reached 500° F. whereupon the panels were removed, the resulting glazed vermiculite panel was found to be substantially free from crazing. The thermal coefficients of the glaze and the fired vermiculite panel were found by conventional techniques to be $7.6 \times 10^{-6}$ units per ° C. $7.9 \times 10^{-7}$ units per ° C. respectively. The flexural strength of the glazed vermiculite panel had a value of 1420 p.s.i. as determined by the above described test. Thus is seen that flexural strength of the panel was increased by about 38 percent using the glaze composition and method illustrated by this example.

The hardness of the glazed vermiculite panel was determined by the force required to penetrate the surface to a depth of 0.010 inch with a ¼" steel ball at a loading rate of .05 in/min. This value was found to be 50 lbs. The permeability to moisture was 0, as determined by the above described test procedure.

The melted glaze composition of this example consisted essentially of the following glaze components in the amounts indicated:

| Components: | Approximate Weight Percent |
|---|---|
| $B_2O_3$ | 25.1 |
| $SiO_2$ | 44.9 |
| $Al_2O_3$ | 14.3 |
| CaO | 10.8 |
| $Na_2O$ | 1.8 |
| $K_2O$ | 0.9 |
| ZnO | 2.2 |

The various data show that the glazed vermiculite prepared in this example is eminently suitable for use in applications such as interior or exterior wall panels where lightweight materials having increased strength, high resistance to moisture permeation, freedom from crazing, and good hardness properties are required for commercial acceptability.

EXAMPLE 2

The following commecially available components and our experimental Frit in the amounts indicated were added to a ball mill or other suitable dispersion apparatus such as a colloid mill. The ball milling requiring approximately 1 hr. for suitable dispersion.

| Components: | Parts By Weight |
|---|---|
| Frit A | 70.5 |
| Frit B | 17.5 |
| $Al(OH)_3$ | 2.0 |
| Jackson ball clay | 10.0 |
| CMC-7MS Gum (Pemco Co.) | 0.3 |
| GS-608 Stain | 3.0 |
| Water | 44.3 |

This slurry was sprayed upon a pressed vermiculite panel at a coverage rate of 1 gm./in.², a thickness of about 0.020 inch, where upon firing for 6 hrs. at 1950° F. the final coating had a thickness of 0.050 inch and the panel had a peneration hardness of 150 lbs. as determined by the predescribed method. The flexural strength of the panel was 1670 p.s.i. and the density 67 p.c.f.

The components used in this example and the final homogeneous glaze have the following compositions:

| Oxide | Frit B | Frit A | Jackson ball clay | Final melted glaze |
|---|---|---|---|---|
| $SiO_2$ | 69.6 | 37.1 | 54.4 | 43.7 |
| $Al_2O_3$ | 0.9 | 5.9 | 30.1 | 8.7 |
| $B_2O_3$ | 26.2 | 35.1 | | 29.3 |
| $Fe_2O_3$ | | 0.2 | 0.9 | 0.2 |
| $Li_2O$ | 0.3 | | | 0.1 |
| $K_2O$ | 1.5 | 1.3 | 0.3 | 1.2 |
| $Na_2O$ | 0.3 | 2.5 | 0.1 | 1.9 |
| CaO | 0.1 | 14.6 | 0.4 | 10.3 |
| MgO | 0.1 | 0.1 | 0.3 | 0.1 |
| ZnO | 1.0 | 3.2 | | 2.5 |
| $TiO_2$ | | | 1.6 | 0.2 |
| LOI | | | 11.9 | 1.8 |

It is to be understood that the foregoing detailed description is given merely by way of illustration and that various modifications may be made therein without departing from the spirit or scope of the present invention.

What is claimed is:

1. A method for increasing the coating thickness, strength, hardness, impermeability and appearance of a pressed vermiculite body which comprises coating said body with a liquid suspension of a reactive unbalanced glaze consisting essentially of from about 20 to 35 parts by weight of boron oxide, from about 35 to about 55 parts by weight silicon dioxide, from about 5 to about 20 parts by weight of aluminum oxide, from about 5 to about 15 parts by weight of calcium oxide, from about 1.0 to about 3.0 parts by weight of sodium oxide, from about 1.0 to about 8.0 parts by weight of zinc oxide, from about 0 to about 0.4 part by weight of iron oxide, from about 0 to 0.4 part by weight of titanium oxide, from about 0 to 0.4 part by weight of lithium oxide, and from about 0 to 0.4 part by weight of magnesium oxide heating the coated body to a temperature of about 1600 to 2000° F. for about ¼ to 60 hours, cooling and recovering the glazed body.

References Cited

UNITED STATES PATENTS

| | | | |
|---|---|---|---|
| 3,384,508 | 5/1968 | Bupp et al. | 117—123 |
| 3,583,883 | 6/1971 | Grego et al. | 117—125 |

WILLIAM D. MARTIN, Primary Examiner

S. L. CHILDS, Assistant Examiner

U.S. Cl. X.R.

106—48; 117—118, 125